(12) United States Patent
Ellams (10) Patent No.: US 6,969,957 B2
(45) Date of Patent: Nov. 29, 2005

(54) IGNITION SYSTEM FOR A HIGH-FREQUENCY HIGH-INTENSITY DISCHARGE LAMP SYSTEM

(75) Inventor: Philip Ellams, Manchester (GB)

(73) Assignee: Power Gems Limited, Manchester (GB)

( * ) Notice: Subject to any disclaimer, the term of this patent is extended or adjusted under 35 U.S.C. 154(b) by 0 days.

(21) Appl. No.: 10/815,520

(22) Filed: Apr. 1, 2004

(65) Prior Publication Data

US 2005/0134192 A1 Jun. 23, 2005

(30) Foreign Application Priority Data

Apr. 1, 2003 (GB) .................................... 0307539

(51) Int. Cl.[7] ............................................. H05B 37/00
(52) U.S. Cl. .................... 315/289; 315/290; 315/283; 315/291; 315/DIG. 7
(58) Field of Search ................................ 315/289, 290, 315/209 R, 291, 276–278, 282, 283, 307, 315/DIG. 7; 323/145, 146, 170, 183, 213

(56) References Cited

U.S. PATENT DOCUMENTS 3,374,396 A * 3/1968 Bell et al. .................... 315/277
6,091,208 A * 7/2000 Flory, IV .................... 315/290
6,392,365 B1 * 5/2002 Zhou et al. .................. 315/291
6,734,637 B2 * 5/2004 Ellams ........................ 315/224

FOREIGN PATENT DOCUMENTS

WO WO 97/43875 * 11/1997

* cited by examiner

Primary Examiner—Haissa Philogene
(74) Attorney, Agent, or Firm—Hodgson Russ LLP (57) ABSTRACT

An ignition system for a high-frequency high-intensity discharge lamp system of a type used for location-lighting during filming or other entertainment venues includes a transformer with a pair of secondary windings, each having a primary winding closely interwound. The secondary windings, which are connected between the steady-state power source and the discharge lamp, are wound for producing opposing magnetic fields with substantial flux cancellation. The primary windings are wound to produce voltage amplification and connected to an ignition circuit adapted to produce high-voltage ignition spikes to turn on the discharge lamp. The system also includes a resonant circuit between the steady-state power source and the transformer. The ignition and resonant circuits are temporarily energized to produce a voltage for igniting the lamp. The advantage of secondary windings with opposing magnetic fields in that a sufficient turns ratio is present to allow the transformer to operate effectively during ignition, while at the same time the opposing magnetic fields result in a low impedance with a reduction in both heat and inductive loss during steady-state operation of the lamp system.

22 Claims, 10 Drawing Sheets

Frequency typically 300 - 400 kHz

C and C' are connected (see Figure 7)
D and D' are connected (see Figure 7)

*Fig. 10*

IGNITION SYSTEM FOR A HIGH-FREQUENCY HIGH-INTENSITY DISCHARGE LAMP SYSTEM

FIELD OF THE INVENTION

The invention relates to an ignition system for a high-frequency (HF) high-intensity discharge (HID) lamp system, and to a power control device for such ignition system.

BACKGROUND OF THE INVENTION

Discharge lamps operate with current limited by a ballast. There are various types of ballasts. At one end is the simple conventional ballast inductor used in sodium lights at power-line frequency. At the other end are the electronic ballasts, in which semiconductors are used to control lamp current. The control elements in electronic ballasts operate at a much higher frequency than is the case with conventional ballasts, and the output frequency of electronic ballasts may be controlled independently from the current-regulating stage of the ballast.

Electronic ballasts are commonly used for location-lighting in filming environments, where the current regulator operates at a high frequency, say 25 kHz, and the output frequency of the ballast is low, say 100 Hz. This is achieved by passing the regulated current through a low-frequency inverter. Such lamps typically operate at power levels anywhere between 200 W and 18 KW. More information on the difference between conventional magnetic ballasts and electronic ballasts can be found in Chapter 5 of "Philips' Medium Source High Intensity Discharge Lamps: Information for Luminaire and Ballast Manufacturers", published by Philips Lighting BV, Belgium, March 2000.

Some electronic ballasts drive the lamp of a lamp system at high frequency. This gives the advantage of a simple power stage, because a low-frequency output inverter is not required. However, operation in this manner is generally limited to low-power lamps because of the problem of "acoustic resonance" (see Section 5.2 of the above Philips reference). In order to avoid acoustic resonances, the driving frequency must be above the highest resonant frequency of the lamp. It is lamp systems operating at these higher frequencies that are the subject of this invention.

Figure 1:
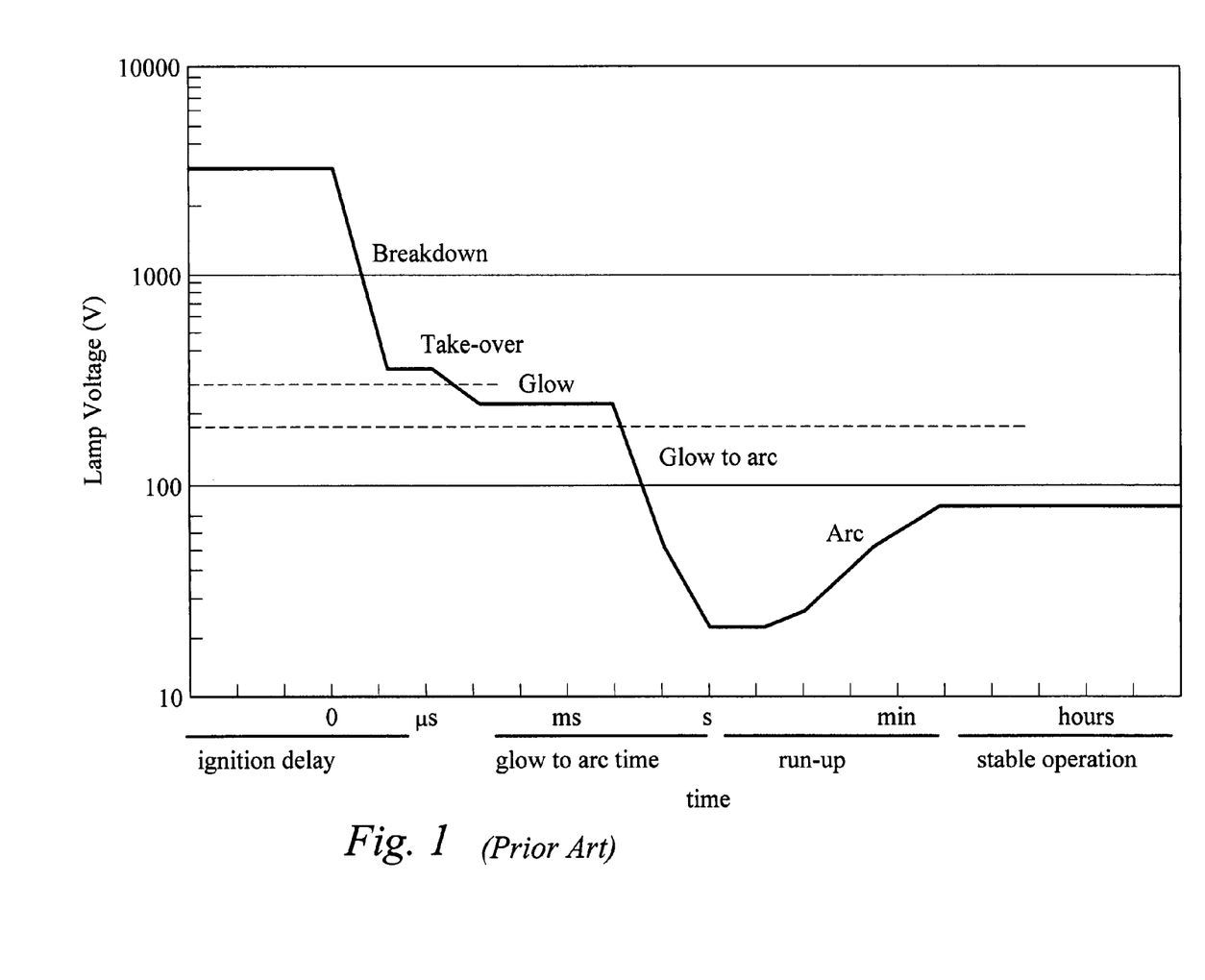
FIG. 1 is a graph illustrating variation of lamp voltage with time during the ignition phases: of an HID lamp system.

FIG. 1, which is taken from Section 4.1 of the above Philips' reference, illustrates the different phases from the moment of switching on the supply power to stable lamp operation for a HID lamp. A successful ignition operation proceeds through all of the voltage-versus-time phases illustrated in FIG. 1, while an unsuccessful ignition results when the process stops in one of those phases. The time scale in FIG. 1 is logarithmic so as to better illustrate the times involved.

The phases in FIG. 1 are; (a) ignition delay, (b) breakdown, (c) take-over, (d) glow, (e) glow-to-arc transition, (f) run-up (arc) phase, and (g) stable operation. The stable operation phase after ignition corresponds to that in which "steady-state voltage" and "steady-state current" operate, as those terms are further used in this document.

Figure 2:
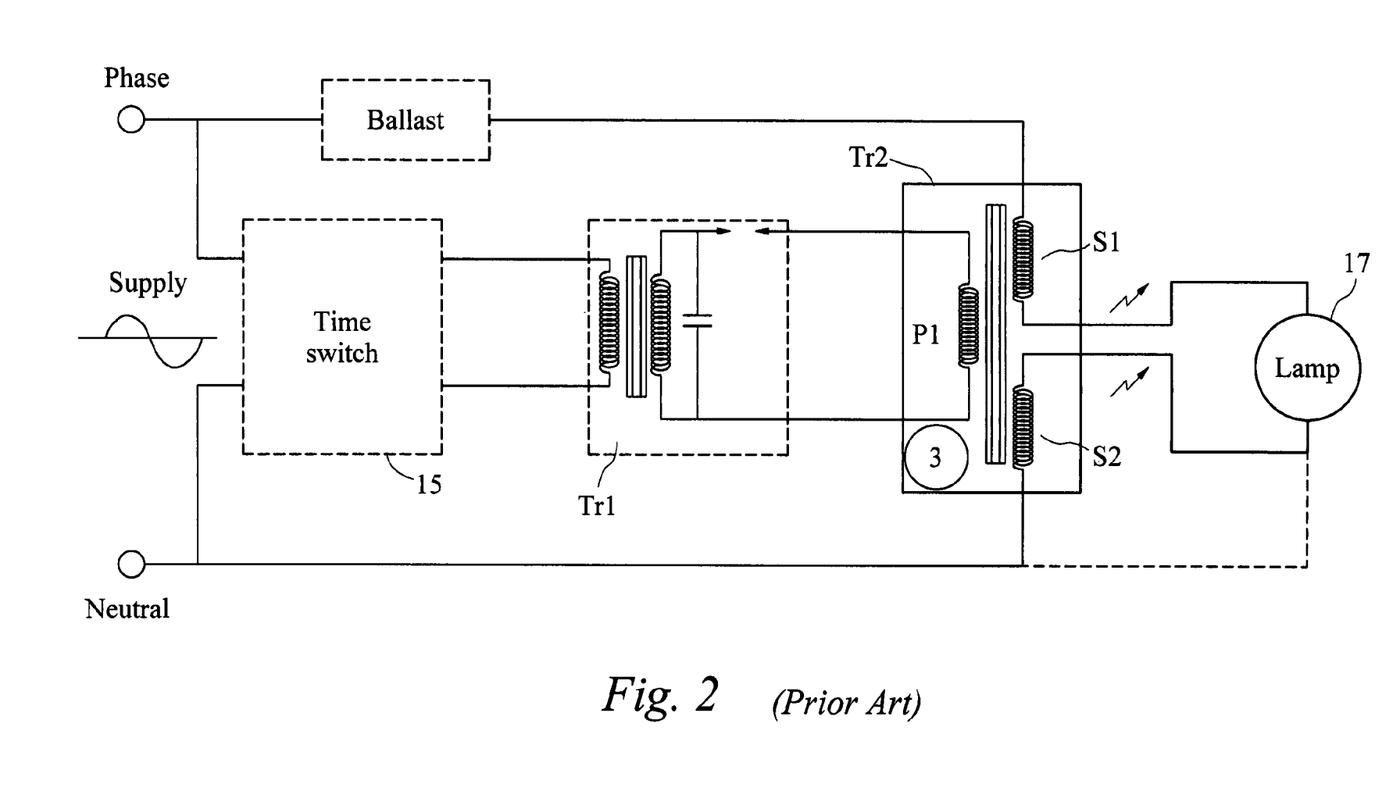
FIG. 2 is a schematic diagram of one type of prior art ignitor circuit for igniting an HID lamp: system.

FIG. 2, which is taken from Section 5.4 of the above philips' reference, illustrates one form of ignitor circuit that may be used for ignition of a high-intensity discharge lamp. The ignitor circuit in FIG. 2 includes a time switch 15 that provides temporary tapping of the power-line voltage, a transformer Tr1 for raising the tapped voltage, and a primary winding P1 of a transformer Tr2 for introducing the raised voltage into the steady-state circuitry of a lamp 17; the secondary windings S1 and S2 of the transformer Tr2 are serially-connected to the lamp 17 and are phase-adding windings. (The term "phase-adding" as used in this document refers to windings that are wound to provide voltage amplification on an output circuit.) A single secondary S1 optionally may be used, as represented by the dashed line in FIG. 2. The difficulty with the type of ignitor circuit shown in FIG. 2 is that the large number of turns on S1 and S2 result in a value of inductance which is too large to allow the necessary amount of lamp current to flow when operating at high frequency. Additionally, high flux levels are induced which would cause overheating of the magnetic core. As will be discussed below, the subject invention seeks to improve on this arrangement.

Among other uses, the subject invention has particular application to HID lamps that provide location lighting in the film industry, although it also has application to other forms of entertainment, such as rock shows, theatre shows, etc. Reliable ignition of location-lighting lamps is of crucial importance for location film shoots, which cannot proceed without proper and sufficient lighting; any delay resulting from lighting problems has a significant cost implication. When HID lamps are hot, they are difficult to ignite since the required ignition voltage is increased; this is the so-called "hot-restrike" condition. There is reference to such hot-restrike ignition capability in the patent literature. For instance, WIPO Patent Publication WO 97/43875 refers to a "hot restrike condition" in regard to a metal halide lamp. However, the voltage required for hot-restrike ignition at the lamp in that reference is considerably below that required by a metal halide lamp used for location lighting in the film industry, where lamps typically operate at a power level 200 W and above.

SUMMARY OF THE INVENTION

It would be an advantage to be able to ignite high-intensity discharge lamps such as those used in location lighting and which operate from a high-frequency ballast. And it would be a further advantage to be able to ignite such lamps quickly, avoiding costly downtime, while also reducing the size, weight and complexity of such lamps as much as possible.

In one form, the invention is an ignition system for a high-frequency high-intensity discharge lamp System, the ignition system being connectable to an output circuit and including two first windings wound for substantial flux cancellation and having at least one further winding, the at least one further winding being temporarily energizable during start-up of the circuit and inductively coupled to he first windings for providing a voltage surge across the first windings.

Preferably, the ignition system also includes high-frequency ferrite material for partially enclosing leakage flux.

Preferably, the output circuit includes a high-intensity discharge lamp. More preferably, the ignition system also includes means for connecting the discharge lamp across an output of the first windings as said output circuit. Still more preferably, the ignition system also includes a ballast circuit connectable across an input of the first windings for producing an alternating-current supply to the discharge lamp for steady-state operation.

Preferably, the ignition system has two of the further windings.

Preferably, the two further windings produce voltage amplification on the output circuit, and during start-up of the output circuit the ignition system acts as a transformer having the first windings as a pair of secondary windings and the further windings as a pair of primary windings, each primary winding being interwound with or adjacent a respective one of the secondary windings on the same magnetic core. More preferably, a number of turns of each secondary winding is greater than a number of turns of each primary winding.

In a second form, the invention is an ignition system for a high-frequency high-intensity discharge lamp system, the ignition system being connectable to a high-intensity discharge lamp and including a pair of primary windings each interwound with a pair of secondary windings, the secondary windings being wound on a common magnetic circuit for substantial flux cancellation, the primary windings being wound for voltage amplification on the output circuit and being temporarily energizable during start-up of the discharge lamp for producing a temporary voltage amplification in the secondary windings.

In a third form, the invention is an ignition system for a high-frequency, high-intensity discharge lamp system, the ignition system being connectable to a high-intensity discharge lamp and including: a core; a pair of primary windings wound on the core for voltage amplification on the output circuit; and, a pair of secondary windings each interwound with a respective primary winding, one end of each secondary winding being connectable to receive power and the other end being connectable to the discharge lamp, the secondary windings being wound on the core such that the magnetic field from one substantially cancels that from the other, the number of turns of each secondary winding being greater than the number of turns of each primary winding, wherein voltage amplification is attained by temporarily energizing the primary windings during start-up of the lamp system, and wherein restriction on maximum current flow results from impedance introduced by the secondary windings.

Preferably, the second and third forms of the invention includes means for connecting the discharge lamp across an output of the secondary windings.

Preferably, the third form of the invention includes a ballast circuit connectable across the one end of the secondary windings for producing an alternating-current supply to the discharge lamp for steady-state operation. More preferably, the ignition system includes: a first resonant circuit for energizing the two primary windings; and, a second resonant circuit connectable across the one end of the secondary windings; wherein, during the start-up operation, the first and second resonant circuits are connected to the respective primary and secondary windings and are simultaneously energized, and wherein, during steady-state operation, the ballast circuit is connected to the secondary windings and the first and second resonant circuits are not operative. Still more preferably, the primary windings are connected in parallel to the first resonant circuit, which first resonant circuit includes a serially-connected spark gap member and an energizing signal source. Even more preferably, the energizing signal source is a secondary winding of a transformer.

Preferably, the second resonant circuit includes; a capacitive means connected in parallel with the secondary windings, and an inductive means connected in series with the secondary windings.

Preferably, in the third form of the invention the core includes a pair of U-shaped cores. More preferably, an insulating tube is fitted over each core before the primary and secondary windings are wound on the core.

Preferably, in the third form of the invention the core is alternatively in the form of a ring.

A fourth form of the invention is a high-frequency high-intensity discharge lamp system that includes the ignition system and the discharge lamp in any of the first to third forms of the invention.

The ignition system of the invention may be used to introduce spikes of high voltage into an output circuit that includes a high-intensity discharge lamp, but does not include a component generating the high inductance losses and heat mentioned above in respect of the circuit of FIG. 2. This is accomplished by utilizing in the ignition system two windings that produce substantial flux cancellation when energized. Such windings not only act to limit current to the output circuit in steady-state operation (as also would windings oriented with adding fields), but have the advantage of avoiding the high inductance losses and heat that result from use of phase-direction windings. If the two windings in the substantial-flux-cancellation configuration are secondary windings of a transformer which also has at least one primary winding connected to an ignitor circuit, there is the advantage that high-voltage ignition pulses may be produced on the secondary windings by a high turns ratio without significant accompanying heat and inductive losses. The advantage stems directly from the secondary windings being wound in a configuration in which the flux from the two windings substantially cancel each other.

The use of windings that substantially cancel each other's magnetic flux, as found in a common-mode choke, resolves two otherwise-conflicting requirements for the power control device. The inductance value required for the secondary windings is relatively low since the circuit is adapted to operate at high frequency, and low inductance tends to suggest use of secondary windings having only a few turns. However, the requirement for stepping up ignition voltage normally calls for a magnetic component with a fairly large number of turns on the secondary windings. The winding layout must withstand high voltage and yet also be small in size. The subject invention addresses those normally-conflicting requirements by utilizing the substantially-flux-cancelling windings. The choke can be made from two windings with a fairly large number of turns. The two windings largely cancel each other out in terms of inductance, but have a small remaining leakage inductance in the correct range for the application. The large number of turns assists in achieving a high output voltage during ignition.

BRIEF DESCRIPTION OF THE DRAWING

Preferred features of the present invention will now be described, by way of example only, with reference to the accompanying drawings, in which.

DETAILED DESCRIPTION OF THE PREFERRED EMBODIMENT

Figure 3:
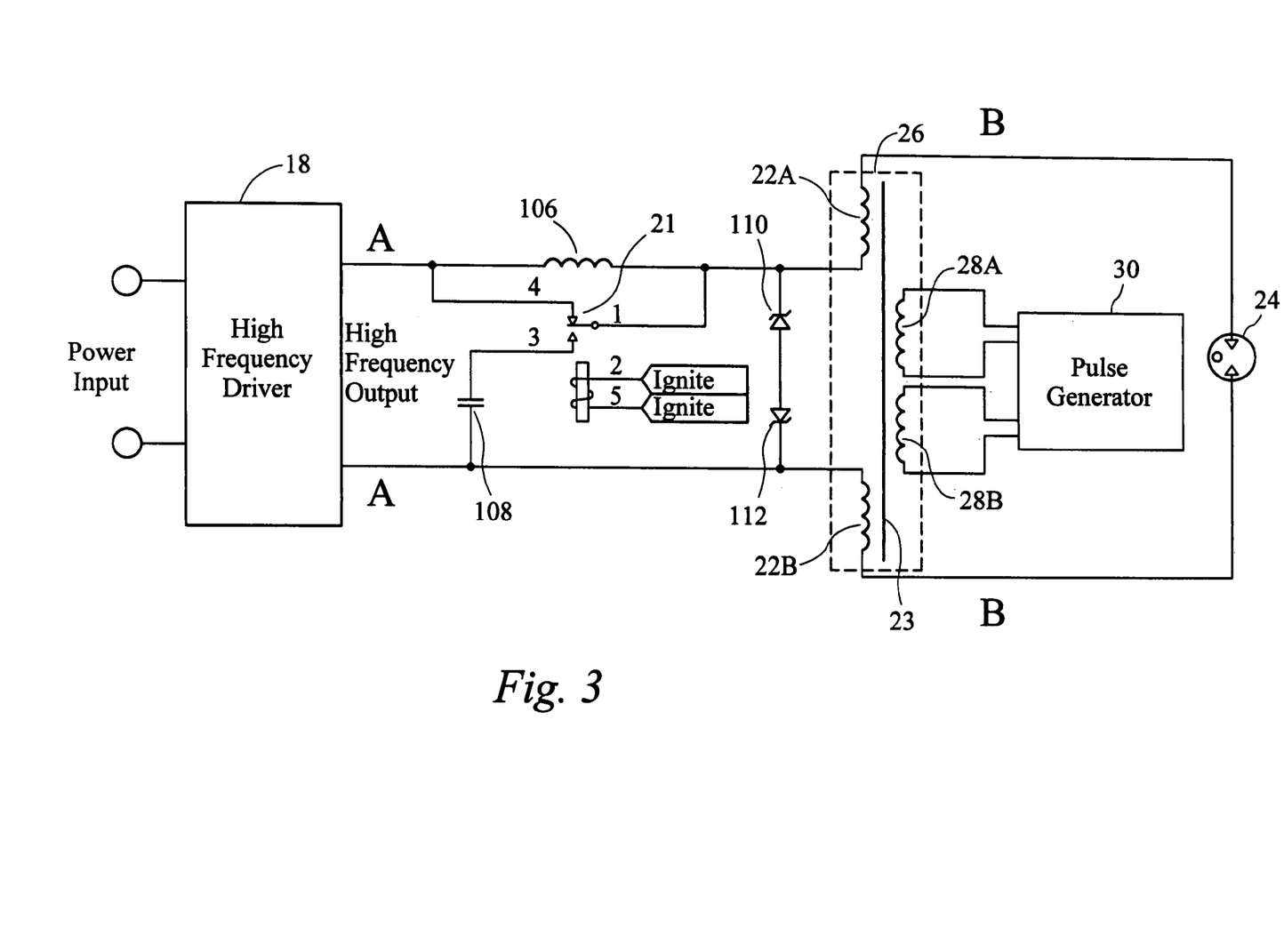
FIG. 3 is a preferred embodiment of the lamp system.
Figure 4:
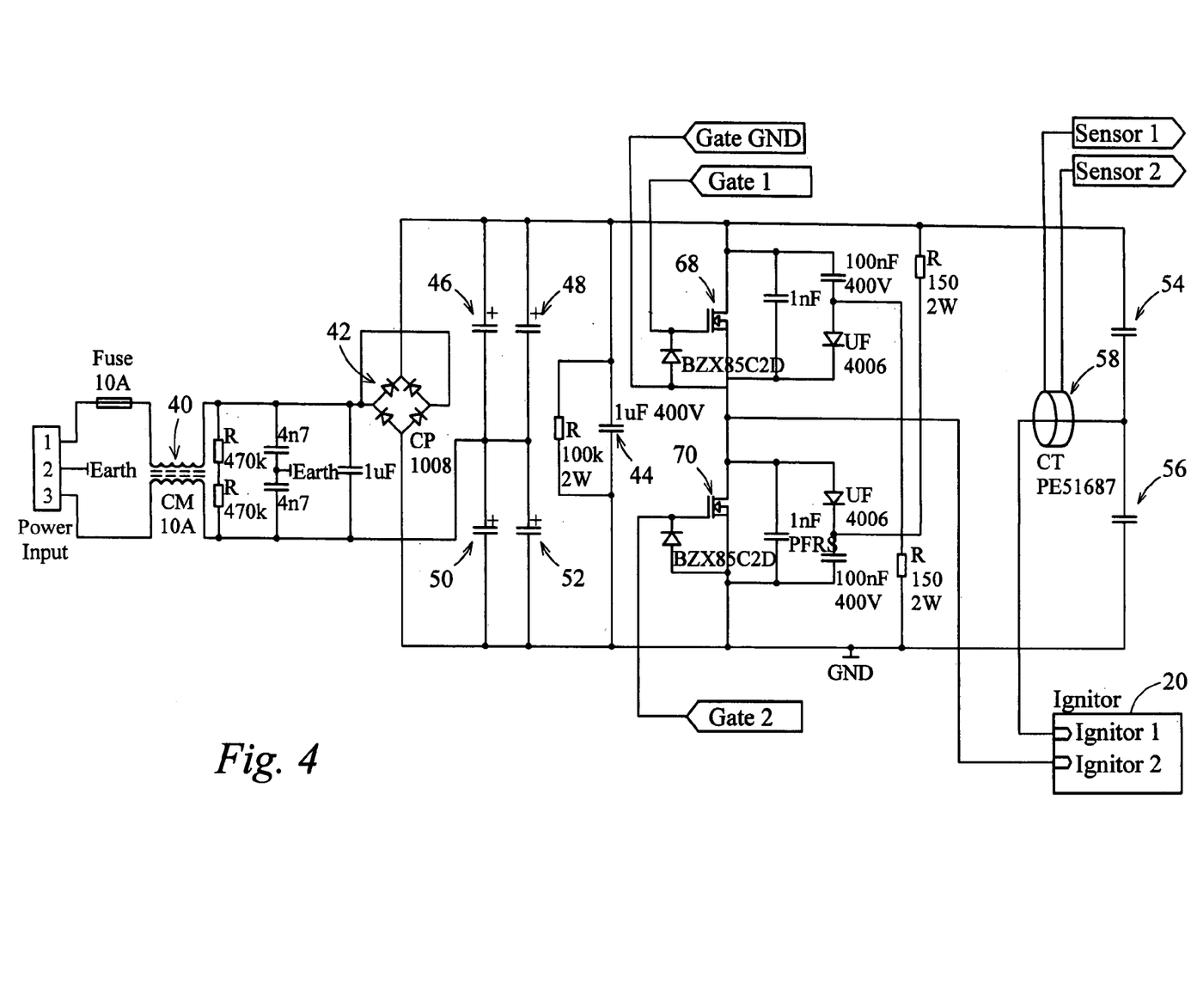
FIG. 4 is a schematic of the ballast power circuit of the preferred embodiment of the lamp system.
Figure 5:
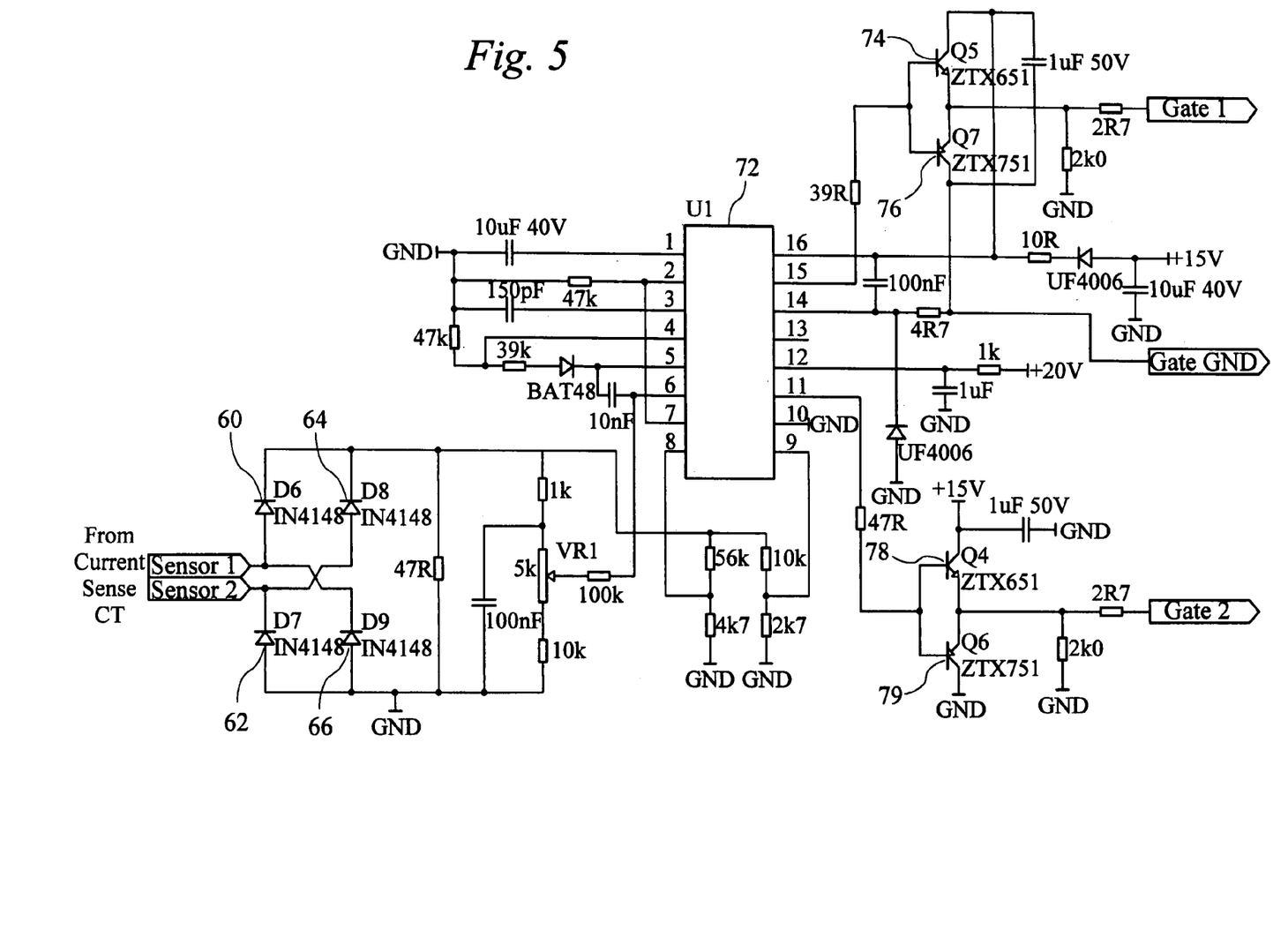
FIG. 5 is a schematic of the ballast control circuit of the preferred embodiment.
Figure 6:
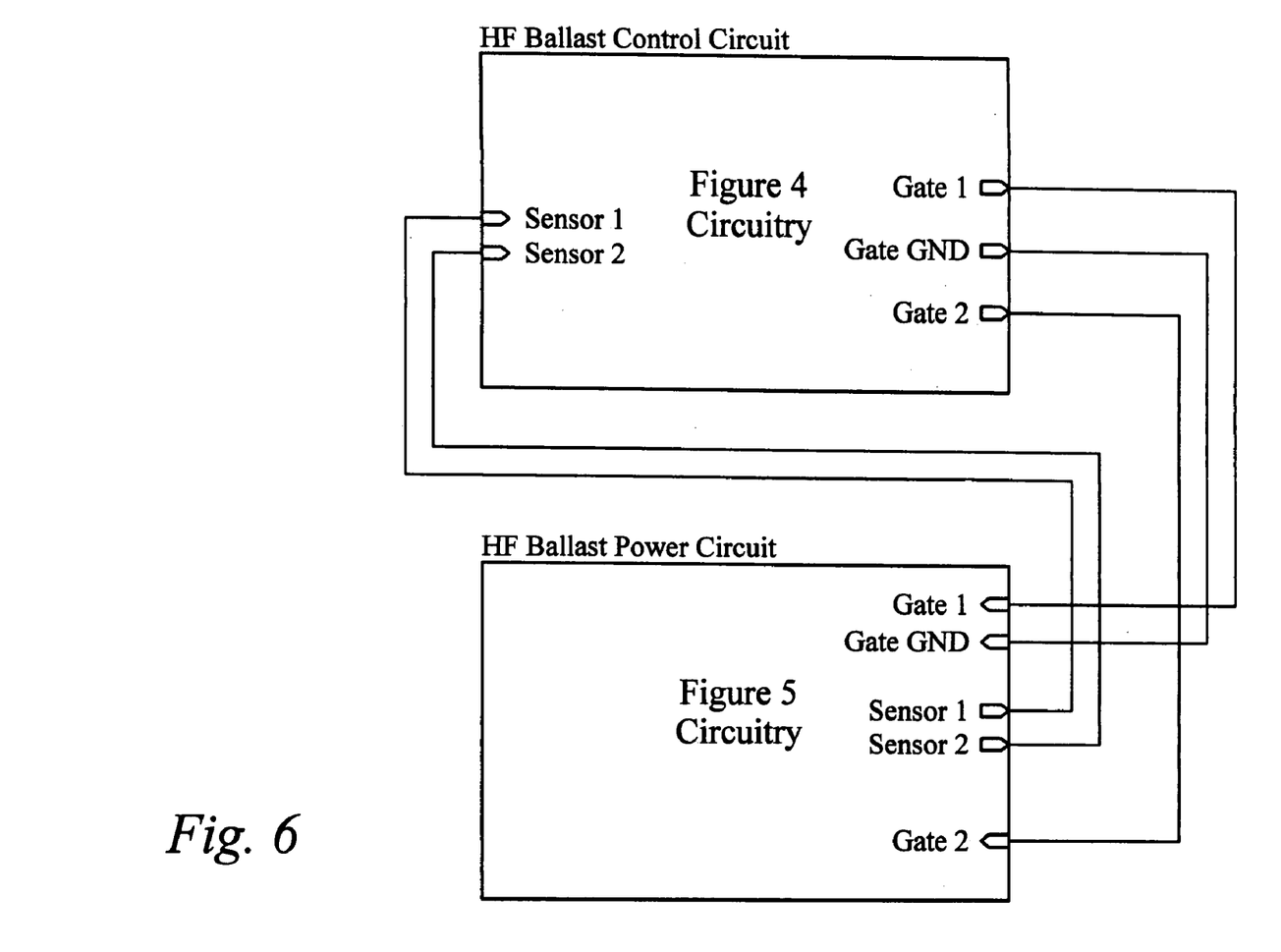
FIG. 6 illustrates wiring connections between the ballast power circuit of FIG. 4 and the ballast control circuit of FIG. 5.

The object of the ignition process is to induce a high-voltage pulse (typically, 3 kV to 25 kV) between two output terminals. This pulse is injected through auxiliary (or primary) windings placed on the same core as the main power windings. To get a good output voltage spike the induced voltage needs to be in the opposite polarity in each power winding, eg. +X and −X, which sum together at the output to give a voltage difference of 2X. This is achieved by fitting two auxiliary windings to the transformer and again making use of the imperfect coupling between windings on the core. Each auxiliary winding is arranged to have good magnetic coupling with one of the main power windings. Thus it induces a high voltage (V) in the winding with which it is close, but due to the imperfect coupling it produces a much smaller voltage (v) in the opposite winding. The same effect happens with the other auxiliary winding, but with opposite polarity. The resultant output voltage of the ignitor is then 2V-2 v. The magnetic arrangement is optimised to give a maximum value for "V" and a minimum value for "v". By this means, large output voltages can be achieved, An initial overview of the circuitry of the preferred embodiment of the invention, as shown in FIGS. 3 to 7, will be described first. FIG. 3 is an overall view of the circuitry FIGS. 4 and 5 show the circuitry of the high-frequency driver circuit 18 in FIG. 3, which driver circuit produces the steady-state voltage waveform shown in FIG. 8(a). FIG. 6 illustrates how the input and output lines of FIGS. 4 and 5 are connected together. The pair of lines that extend to box 20 in FIG. 4 are the output of driver circuit 18; those lines are shown as input to the circuitry that is shown in the lower portion of FIG. 7.

Figure 8A:
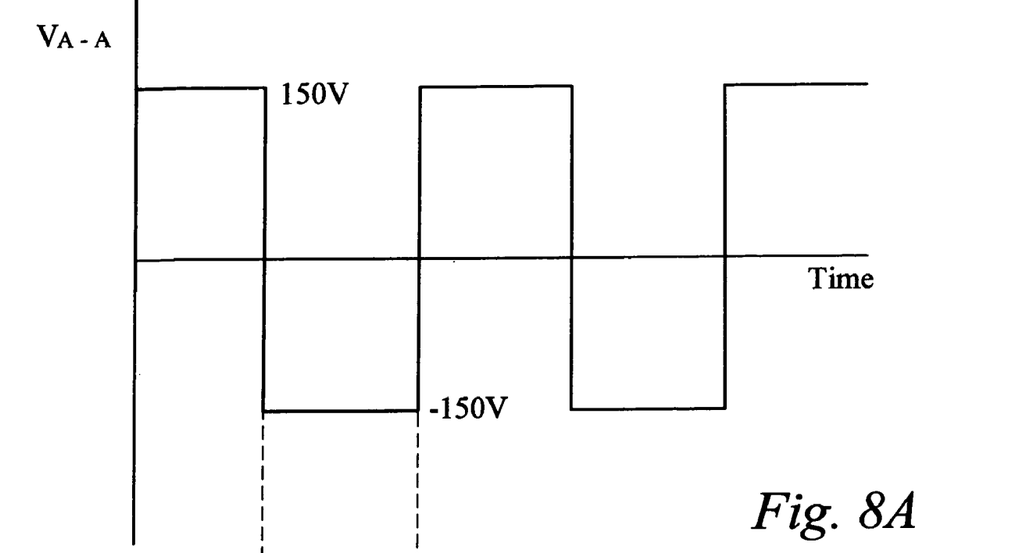
FIGS. 8(a) and 8(b) respectively illustrate voltage waveforms across the positions indicated as A—A and B—B in FIG. 3 during periods when the lamp system is in steady-state operation.
Figure 8B:
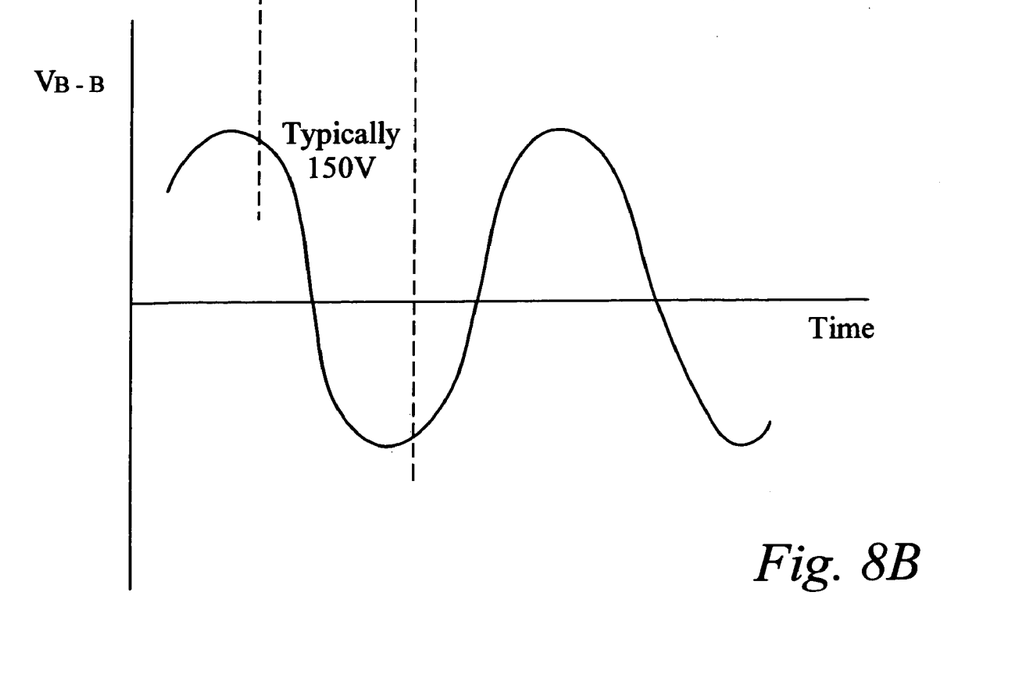

With reference to FIG. 3, a standard mains-supply 50/60 Hz power input is fed into the high-frequency driver circuit 18 to create a 300V Peak-to-Peak output voltage waveform with a typical frequency between 300 and 400 KHz. That output voltage waveform is shown in FIG. 8(a).

During steady-state operation of the lamp assembly of FIG. 3, a relay switch 21 is in a first position (the position shown in FIG. 3). Current flows through a pair of windings 22A and 22B which are wound on a core 23 such that their magnetic fields extend in opposite directions and produce substantial flux cancellation, as in a common-mode choke configuration. This results in a low value of inductance.

In an ideal common-mode choke there would exist perfect magnetic linking between the two windings, which would cause flux cancellation when a differential current flowed and would result in zero inductance. However, in practice the flux linkage in a common-mode choke is not perfect and there is leakage; this means that, in the presence of differential currents, there exists some residual inductance. This invention uses the residual inductance of the windings 22A and 22B to control current to a lamp 24.

That part of the FIG. 3 circuitry that is used for igniting the lamp 24 will next be described.

The ignition circuit in this preferred embodiment includes the pair of windings 22A and 22B as secondary windings of a transformer 26. A pair of primary windings 28A and 28B are wound on the core 23 in a phase-adding direction. Each of the primary windings 28A and 28B is closely interwound with a respective one of the secondary windings 22A and 22B. The use of the word "interwound" in this document in respect of the relationship between primary windings and secondary windings refers to primary windings that extend on top of, or are interleaved with, the secondary windings. The invention might make use of a single primary winding, wound on core 23 but not interwound with either of a pair of secondary windings however, maximum advantage is gained by use of two primary windings each closely interwound with a respective secondary winding.

The ignition circuit also includes the pulse generator 30 connected to the pair of primary windings 28A and 28B, and further includes the L-C circuit shown in FIG. 3 as positioned between the driver circuit 18 and the transformer 26. The pulse generator 30 will be described in detail subsequently, with reference to FIG. 7. The relay switch 21 will also be described subsequently. At this point it should be noted that the relay switch 21 moves to its second position, activating the L-C circuit, at the same time that the pulse generator 30 begins to send pulses through the primary windings 28A and 28B.

A schematic of the ballast power circuit of the high-frequency driver circuit 18 is shown in FIG. 4. Power input passes through a common-mode choke 40 so as to reduce electromagnetic interference, and is then fed through a half-bridge rectifier 42. Capacitors 44, 46, 48, 50 and 52 smooth the voltage output, producing the 150V pulse-train voltage waveform shown in FIG. 8(a). Capacitors 54 and 56 form an AC path through which the lamp current flows back to the DC link. The lamp current is sensed by current transformer 58 and forms an alternating input to the ballast control circuit of FIG. 5, as discussed below. The ballast control circuit uses that alternating input, after rectification by the diodes 60., 62, 64 and 66, as a control signal in producing the respective Gate 1 and Gate 2 outputs that control the ON/ OFF state of the transistors 68 and 70 in FIG. 4. The Gate GND line in FIG. 4 represents a floating ground voltage connected to the Gate GND line in FIG. 5.

The ballast control circuit of FIG. 5 utilizes a ballast control IC chip 72. That IC chip generates a pulse-train drive of square waves which is applied to the two transistors of the half-bridge arrangement via the gate drivers, which consist of first paired transistors 74 and 76, and second paired transistors 78 and 79. The square waves are in anti-phase, in order that only one transistor conducts at any one time. The result is to produce at point A—A in FIG. 3, i.e. the input to the secondary windings 22A and 22B, the high-voltage square wave shown in FIG. 8(a). Control of current is achieved by varying the frequency of the square wave. If the frequency increases, then the impedance to current flow exerted by the windings 22A and 22B increases, and vice versa. IC chip 72 measures the lamp current and makes the necessary frequency adjustments in order to maintain current flow at a fixed level.

FIG. 6 illustrates the wiring connections between the ballast power circuit of FIG. 4 and the ballast control circuit of FIG. 5.

Figure 7:
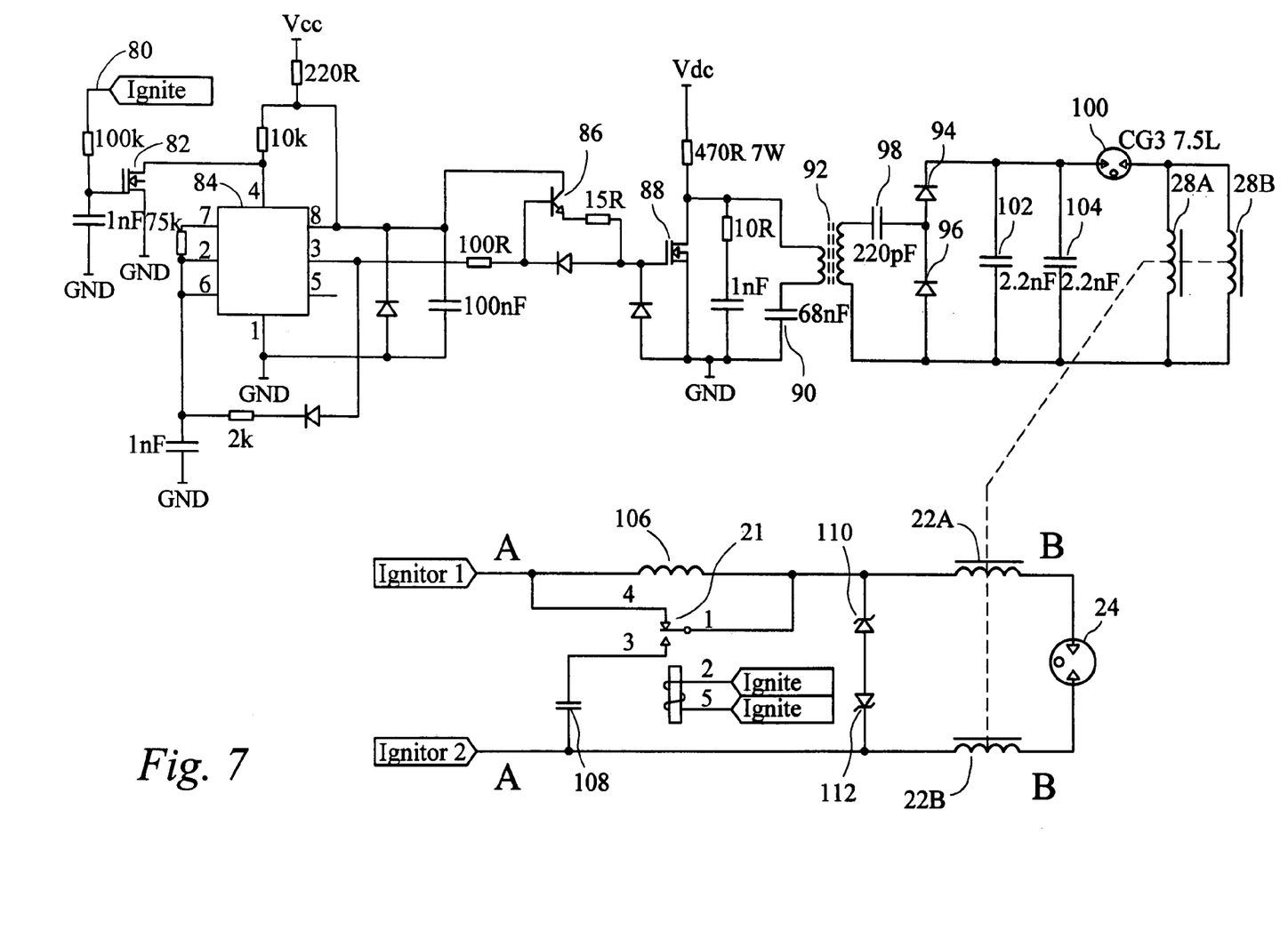
FIG. 7 is a schematic of the ignitor circuit of the preferred embodiment.

Illustrated in FIG. 7 is the ignitor circuit of the invention. This circuit produces a voltage output that, during the ignition phase of the lamp assembly, is superimposed on the voltage output described above from the power and control circuits. During ignition the resulting voltage waveform is illustrated in FIG. 9(a).

The mains-supply is rectified to produce the direct current voltages $V_{cc}$ and $V_{dc}$ that power the ignitor circuit of FIG. 7. Operation of the ignitor circuit commences when the Ignite input 80 is placed in a high state, which turns on a transistor 82 and activates a second IC chip 84. The IC chip 84 begins outputting a pulse train which is input to a transistor 86. An output from the emitter of the transistor 86 is fed to the gate of a driver transistor 88 which in combination with the capacitor 90 applies an S alternating voltage to a step-up transformer 92. Diodes 94 and 96 and capacitor 98 form a charge pump which is driven by the output of transformer 92. The charge pump acts to pump up the voltage on spark gap 100 and parallel-connected capacitors 102 and 104 until that voltage reaches the breakover voltage of the spark gap 100. The spark gap 100 is chosen so as to have a breakover voltage that is typically 7.5 kV for hot-restrike ignition. As the voltage across the spark gap 100 falls to a low value, a resonant circuit forms consisting of the capacitors 102 and 104 and the parallel-connected primary windings 28A and 28B of transformer 26. The resonant circuit resonates at a frequency of approximately 15 MHz with rapid amplitude decay (see FIG. 9(b)) as the energy is transferred from the capacitors 102 and 104 to the primary windings 28A and 28B. Once the current oscillations fall below a certain magnitude, the spark gap 100 opens, allowing the capacitors 102 and 104 to recharge to repeat the process. The repetition frequency is approximately 0.5 kHz. The turns ratio between each secondary winding 22A, 22B and the respective primary winding 28A, 28B is 11 to 3.

Simultaneously with the Ignite input 80 being placed in a high state, the relay switch 21 moves to the second position, which adds the inductor 106 and capacitor 108 into the circuitry. A resonation created by the addition of those two elements causes the voltage applied to the secondary windings 22A and 22B of the transformer 26 to increase. This increased voltage is necessary for ignition to proceed through the "glow discharge" period. The maximum open-circuit voltage is clamped by two transient absorbers 110 and 112, which limit that voltage to approximately 400 volts. Without such resonance, the natural open-circuit voltage of the ballast, which is approximately 200 volts, would be insufficient to guarantee ignition of the lamp. This is discussed in the earlier-mentioned Philips' reference and can be seen from FIG. 1, where the lower dashed line indicates 200 volts and the upper dashed line indicates 400 volts.

Figure 9A:
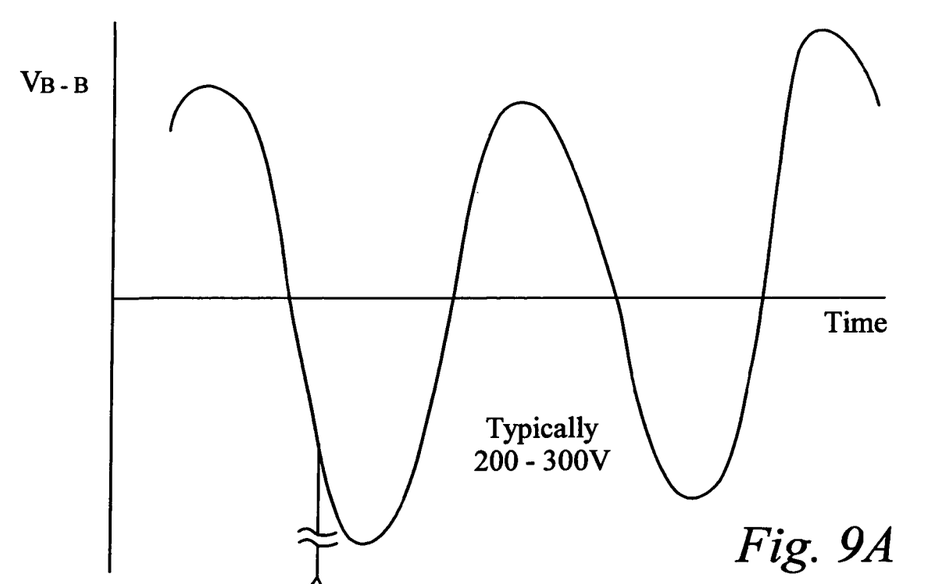
FIG. 9(a) illustrates a voltage waveform across the position B—B during the ignition stage, the waveform being an irregular sinewave.
Figure 9B:
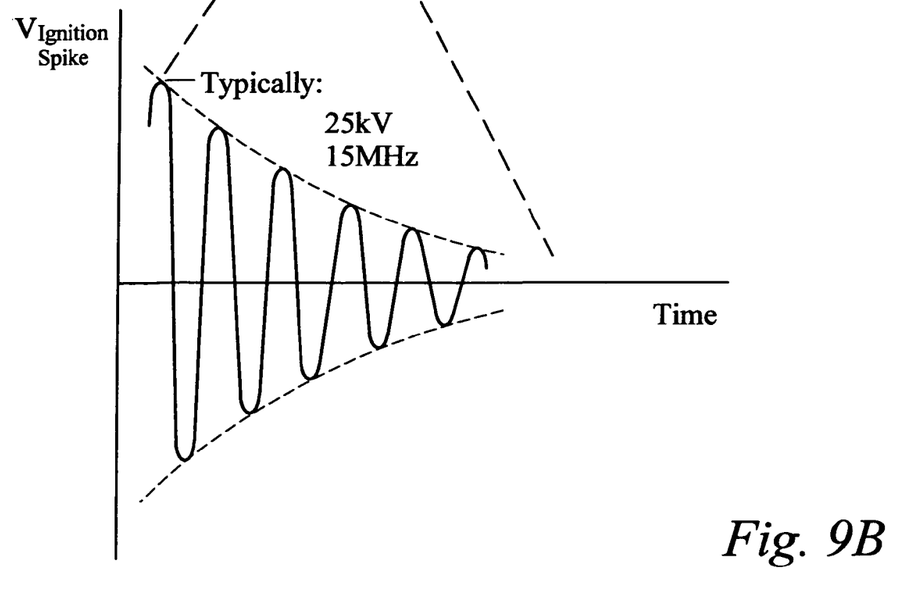
FIG. 9(b) is an amplified view of one of the voltage spikes that are included in the irregular sinewave waveform of FIG. 9(a); and, FIG. 10 illustrates one way that primary windings and secondary windings may be interwound on the core of a transformer used in the invention.

FIG. 9(a) illustrates the voltage waveform across the secondary windings 22A, 22B with the inductor 106 and capacitor 108 acting on the output from the driver circuit 18, and also with the ignition spikes from primary windings 28A, 28B acting on the secondary windings 22A, 22B. The voltage waveform of FIG. 9(a) is an irregular sinewave. Due to the action of the resonant circuit discussed above that includes the spark gal 100, the amplitude of ignition spikes that are produced on the primary windings 28A, 28B decay from an initial maximum of approximately 25 kV, as shown in FIG. 9(b). A new maximum, i.e. a breakover of 25 spark gap 100, occurs approximately every two milliseconds. Since the irregular sinewave has a frequency in the order of 300 to 400 kHz and the ignition spikes have a repetition frequency of only approximately 0.5 kHz, the resonant waveform with decaying amplitude shown in FIG. 9(b) forms a part of only one out of approximately every 600 to 800 of the irregular sinewaves shown in FIG. 9(a), The voltage spikes shown in FIG. 9(b) have proven quite effective for producing hot-restrike ignition of HID lamps.

Figure 10:
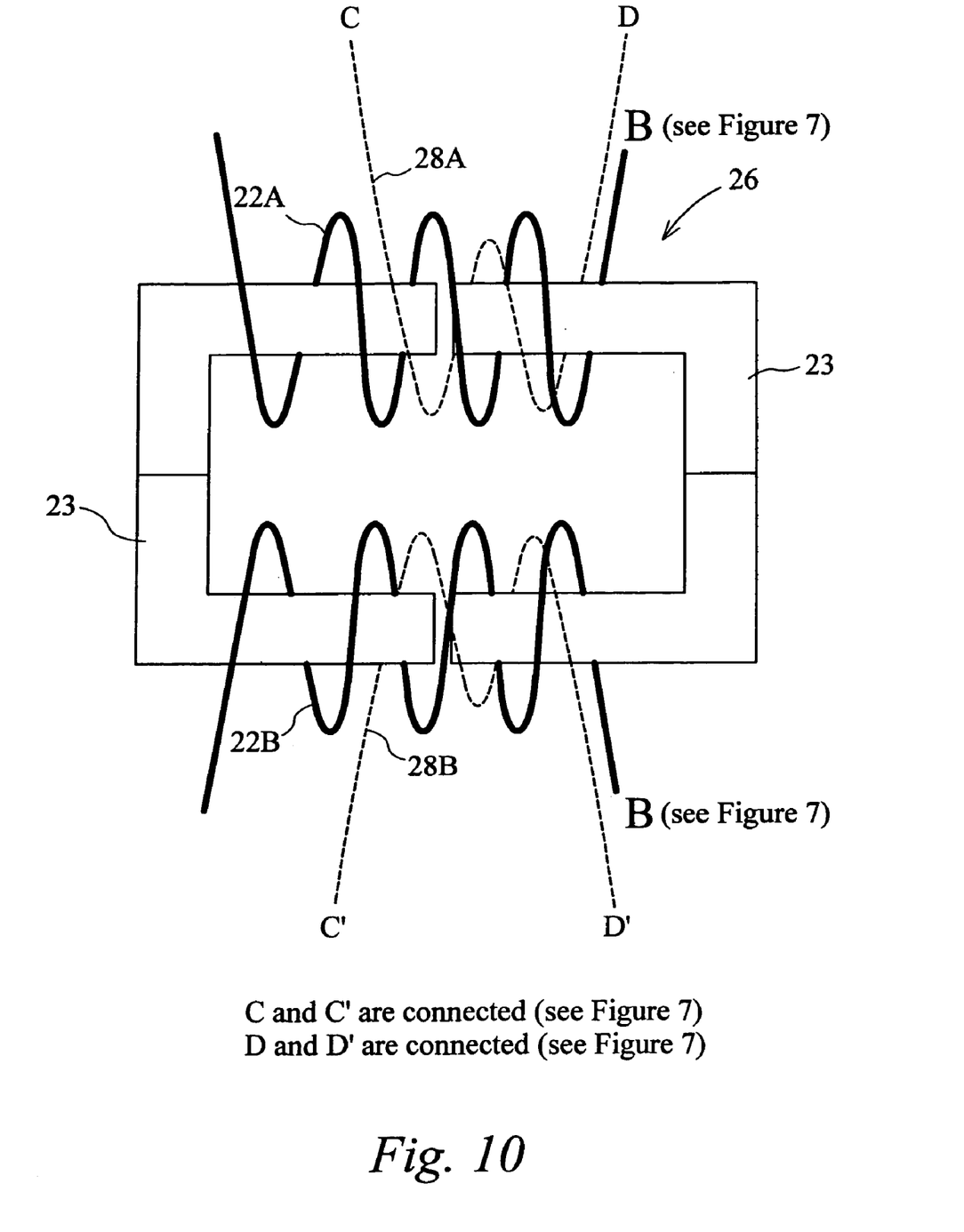

Ignition is initiated through circuitry (not shown) to simultaneously close the ignition switch 80 and the relay switch 21 for about 0.5 seconds; a timer can be included so as to limit closing of the circuit to that period. If the ignition circuit were left connected to the power circuit during steady-state operation after ignition, it would form an unwanted load on the ballast.

with respect to the core used in the transformer, it has been found that the physical arrangement which works best in this application is to use a pair of "U" cores, although there are probably several other ways of doing it, the most likely alternative being a ring core. The advantage of "U" cores is that an insulating sleeve can be easily slipped over the core to stand off the high voltages which are induced in the windings FIG. 10 shows how the windings are arranged in practice. (For clarity the number of turns has been reduced in FIG. 10.) As-mentioned above, each of the secondary windings consists typically of 11 turns, and each primary winding typically of 3 turns. Again, for clarity, a gap is shown between the two magnetic cores. In practice there is no gap, although conceivably some designs could employ a gap. Additionally, reinforced insulation is used between the windings and the core. This is achieved by fitting a nylon tube over the core limbs.

Due to the leakage field which emanates from the transformer, it is advantageous to screen the transformer from surrounding metalwork in order to avoid eddy-current heating. Slabs of high-frequency ferrite material may be glued to the sides of the ignition circuit to provide a low-loss screening. The ferrite acts as a low-impedance path for stray flux from the primary windings, and acts to contain such stray flux.

While the present invention has been described in its preferred embodiment, it is to be understood that the words which have been used are words of description rather than limitation, and that changes may be made to the invention without departing from its scope as defined by the appended claims.

Each feature disclosed in this specification (which term includes the claims) and/or shown in the drawings may be incorporated in the invention independently of other disclosed and/or illustrated features.

The text of the abstract filed herewith is repeated here as part of the specification.

An ignition system for a high-frequency high-intensity discharge lamp system of a type used for location-lighting during filming or other entertainment venues includes a transformer with a pair of secondary windings each having a primary winding closely interwound. The secondary windings, which are connected between the steady-state power source and the discharge lamp, are wound for producing opposing magnetic fields with substantial flux cancellation. The primary windings are wound to produce voltage amplification and connected to an ignition circuit adapted to produce high-voltage ignition spikes to turn on the discharge lamp. The system also includes a resonant circuit between the steady-state power source and the transformer. The ignition and resonant circuits are temporarily energized to produce a voltage for igniting the lamp. The advantage of secondary windings with opposing magnetic fields is that a sufficient turns ratio is present to allow the transformer to operate effectively during ignition, while at the same time the opposing magnetic fields result in a low impedance with a reduction in both heat and inductive loss during steady-state operation of the lamp system.

What is claimed is:

1. An ignition system for a high-frequency high-intensity discharge lamp system, the ignition system being connectable to an output circuit and comprising two first windings wound for substantial flux cancellation and having at least one further winding, the at least one further winding being temporarily energizable during start-up of the circuit and inductively coupled to the first windings for providing a voltage surge across the first windings.

2. The ignition system of claim 1, wherein the output circuit comprises a high-intensity discharge lamp.

3. The ignition system of claim 2, wherein the ignition system has two of the further windings.

4. The ignition system of claim 3, wherein the two further windings produce voltage amplification on the output circuit, and wherein during start-up-of the output circuit the ignition system acts as a transformer having the first windings as a pair of secondary windings and the further windings as a pair of primary windings, each primary winding being interwound with or adjacent a respective one of the secondary windings on the same magnetic core.

5. The ignition system of claim 4, wherein a number of turns of each secondary winding is greater than a number of turns of each primary winding.

6. The ignition system of claim 3, also comprising a ballast circuit connectable across an input of the first windings for producing an alternating-current supply to the discharge lamp for steady-state operation.

7. A high-frequency high-intensity discharge lamp system comprising the ignition system and the discharge lamp of claim 2.

8. The ignition system of claim 1, and also comprising high-frequency ferrite material for partially enclosing leakage flux.

9. The ignition system of claim 2, and means for connecting the discharge lamp across an output of the first windings as said output circuit.

10. An ignition system for a high-frequency, high-intensity discharge lamp system, the ignition system being connectable to a high-intensity discharge lamp and comprising:
   a core;
   a pair of primary windings wound on the core for voltage amplification on an output circuit; and,
   a pair of secondary windings each interwound with a respective primary winding, one end of each secondary winding being connectable to receive power and the other end being connectable to the discharge lamp, the secondary windings being wound on the core such that the magnetic field from one substantially cancels that from the other, the number of turns of each secondary winding being greater than the number of turns of each primary winding, wherein voltage amplification is attained by temporarily energizing the primary windings during start-up of the lamp system, and wherein restriction on maximum current flow results from impedance introduced by the secondary windings.

11. The ignition system of claim 10, and means for connecting the discharge lamp across an output of the secondary windings.

12. The ignition system of claim 10, also comprising a ballast circuit connectable across the one end of the secondary windings for producing an alternating-current supply to the discharge lamp for steady-state operation.

13. The ignition system of claim 12, also comprising:
   a first resonant circuit for energizing the two primary windings; and,
   a second resonant circuit connectable across the one end of the secondary windings;
wherein, during the start-up operation, the first and second resonant circuits are connected to the respective primary and secondary windings and are simultaneously energized, and wherein, during steady-state operation, the ballast circuit is connected to the secondary windings and the first and second resonant circuits are not operative.

14. The ignition system of claim 13, wherein the primary windings are connected in parallel to the first resonant circuit, which first resonant circuit comprises a serially-connected spark gap member and an energizing signal source.

15. The ignition system of claim 14, wherein the energizing signal source is a secondary winding of a transformer.

16. The ignition system of claim 13, wherein the second resonant circuit comprises a capacitive means connected in parallel with the secondary windings, and an inductive means connected in series with the secondary windings.

17. The ignition system of claim 10, wherein the core comprises a pair of U-shaped cores.

18. The ignition system of claim 17, wherein an insulating tube is fitted over each core before the primary and secondary winding are wound on the core.

19. The ignition system of claim 10, wherein the core is in the form of a ring.

20. A high-frequency high-intensity discharge lamp system comprising the ignition system and the discharge lamp of claim 10.

21. An ignition system for a high-frequency high-intensity discharge lamp system, the ignition system being connectable to a high-intensity discharge lamp and comprising a pair of primary windings each interwound with a pair of secondary windings, the secondary windings being wound on a common magnetic circuit for substantial flux cancellation, the primary windings being wound for voltage amplification on an output circuit and being temporarily energizable during start-up of the discharge lamp for producing a temporary voltage amplification in the secondary windings.

22. A high-frequency high-intensity discharge lamp system comprising the ignition system and the discharge lamp of claim 21.

* * * * *